March 24, 1931. M. H. HILL 1,797,341
METHOD OF AND MACHINE FOR PRODUCING GEARS
Filed Dec. 30, 1927 5 Sheets-Sheet 1

INVENTOR
M.H.Hill
BY Schlesinger
ATTORNEY

March 24, 1931.  M. H. HILL  1,797,341
METHOD OF AND MACHINE FOR PRODUCING GEARS
Filed Dec. 30, 1927  5 Sheets-Sheet 2

INVENTOR
M. H. Hill
BY
B. J. Schlesinger
ATTORNEY

March 24, 1931.                   M. H. HILL                    1,797,341
                METHOD OF AND MACHINE FOR PRODUCING GEARS
                  Filed Dec. 30, 1927        5 Sheets-Sheet 3

INVENTOR
M H Hill
BY
[signature]
ATTORNEY

March 24, 1931. M. H. HILL 1,797,341
METHOD OF AND MACHINE FOR PRODUCING GEARS
Filed Dec. 30, 1927 5 Sheets-Sheet 4
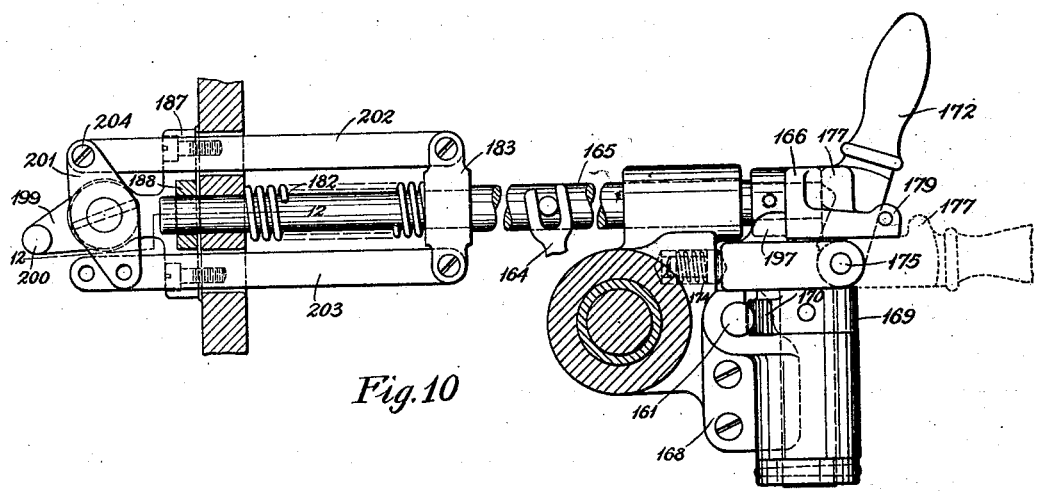
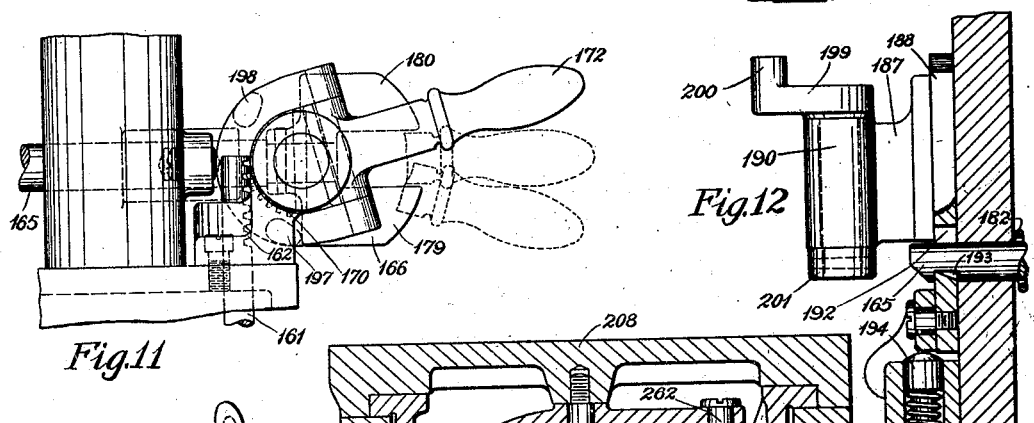
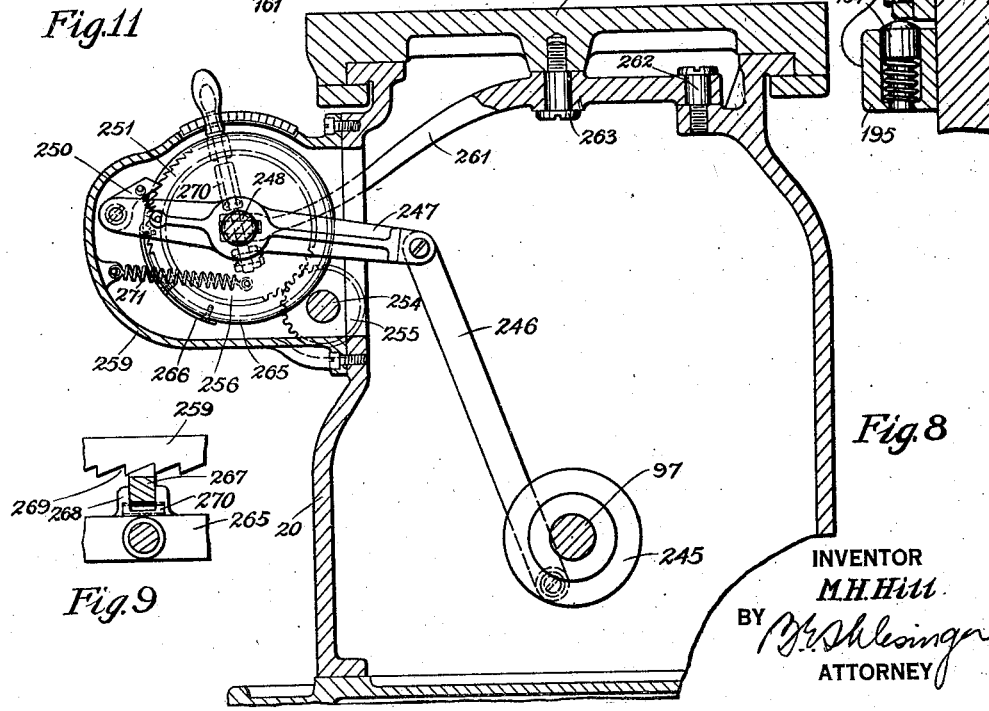
INVENTOR
M.H.Hill
BY
ATTORNEY

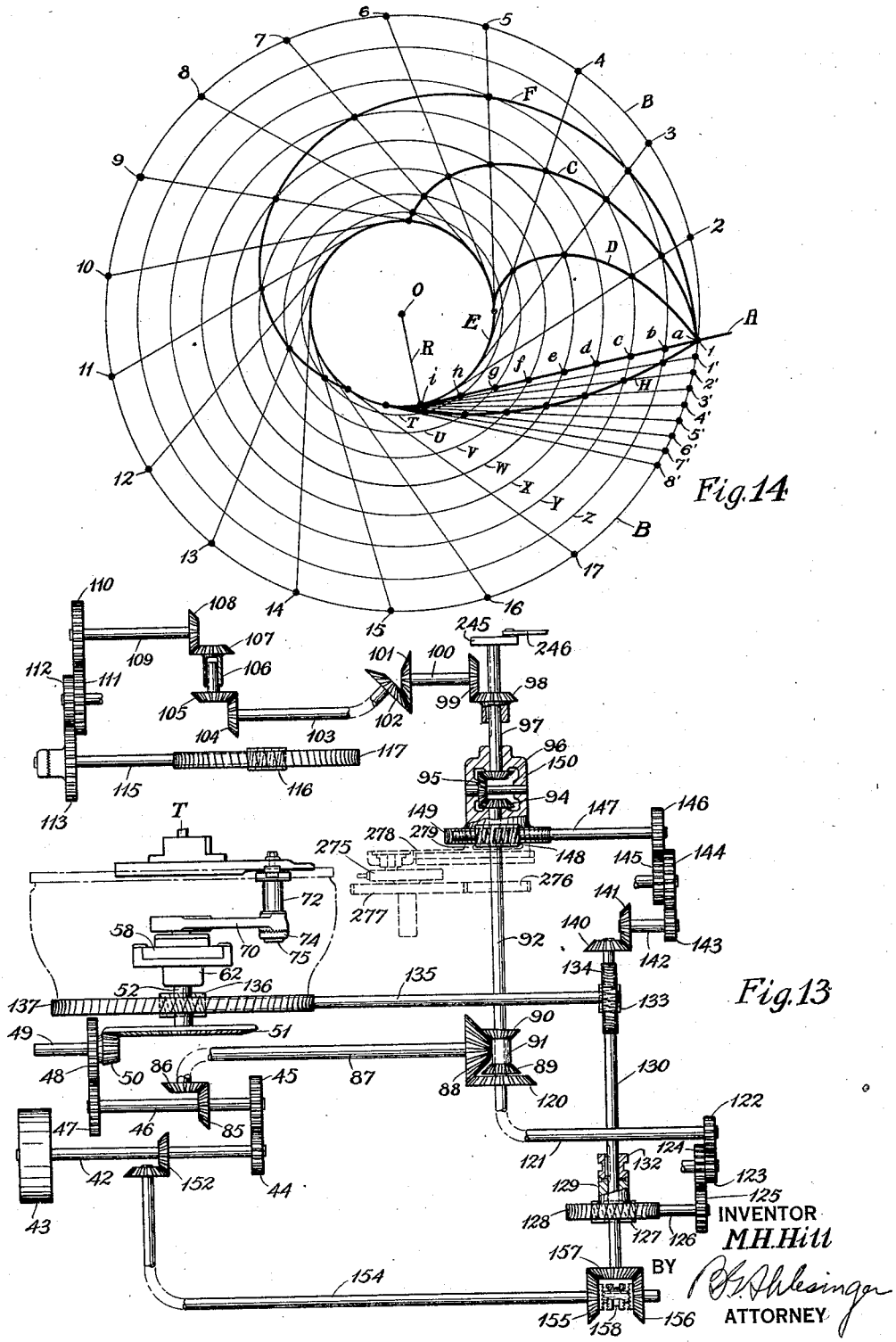

Patented Mar. 24, 1931

1,797,341

UNITED STATES PATENT OFFICE

MAXWELL H. HILL, OF ROCHESTER, NEW YORK, ASSIGNOR TO GLEASON WORKS, OF ROCHESTER, NEW YORK, A CORPORATION OF NEW YORK

METHOD OF AND MACHINE FOR PRODUCING GEARS

Application filed December 30, 1927. Serial No. 243,615.

The present invention relates to a method and machine for producing gears and more particularly to a method and machine for cutting gears in a continuous indexing process with planing tools. In a still more particular aspect, this invention relates to a method and machine for cutting spiral bevel gears.

By reciprocating a tool across the face of a continuously rotating gear blank, it is possible to cut spiral or helical teeth upon the blank and at the same time the continuous uniform rotational movement of the blank can be employed to continuously index the blank. In a planing machine operating upon this continuous indexing principle, it is most usual to employ a crank for reciprocating the tool or tools, since with a crank drive, the tool will be brought, before reversal at either end of its stroke, to a gradual stop and then gradually started in the opposite direction, the motion of the tool being thus smooth and without jar. When a tool is driven by a crank, however, difficulties are experienced with the form of tooth curve and the tool clearance angle along the cut, because of the variation in the tool speed, unless some means is provided for counteracting this variation in tool speed.

A principal purpose of the present invention is to provide means for driving the tool at a uniform velocity during the cut which will combine with it the slow stop and start advantages of the crank.

A further purpose of this invention particularly applicable to tapered gears is the provision of a method and means for controlling the spiral angle of the teeth to be cut on the blank. With this feature, is combined, also, the provision of means of cutting gears having teeth of substantially constant spiral angle throughout their lengths and in which the clearance angle of the tool will be substantially uniform along the cut.

Another object of this invention is to provide an improved form of clapping mechanism for moving the tool or tools to and from cutting position.

A still further object of this invention is to provide a two-tool drive for a machine of the character described, in which the tools will be reciprocated simultaneously in opposite directions so that any possible vibration caused by the movement of one tool slide will be balanced by the opposite movement of the other and so that the tools will cut alternately upon the blank.

The invention includes, also, a number of other meritorious mechanical features, as will appear hereinafter from the specification.

In the drawings:

Figure 8 is a section through the base of the machine showing details of the feed mechanism;

Figure 9 is a fragmentary plan view of the locking device for the feed control disc;

Figure 10 is a plan view illustrating the control mechanism for the slow and fast speed drives for the cradle;

Figure 11 is a side elevation of the control lever and associated parts of this mechanism.

Figure 12 is a section on the line 12—12 of Figure 10;

Figure 13 is a diagrammatic view of the drive mechanism of the machine illustrated; and Figure 14 is a diagrammatic view illustrating the various forms of curves which may be produced upon a tapered gear blank by a machine operating according to this invention.

Figure 1:
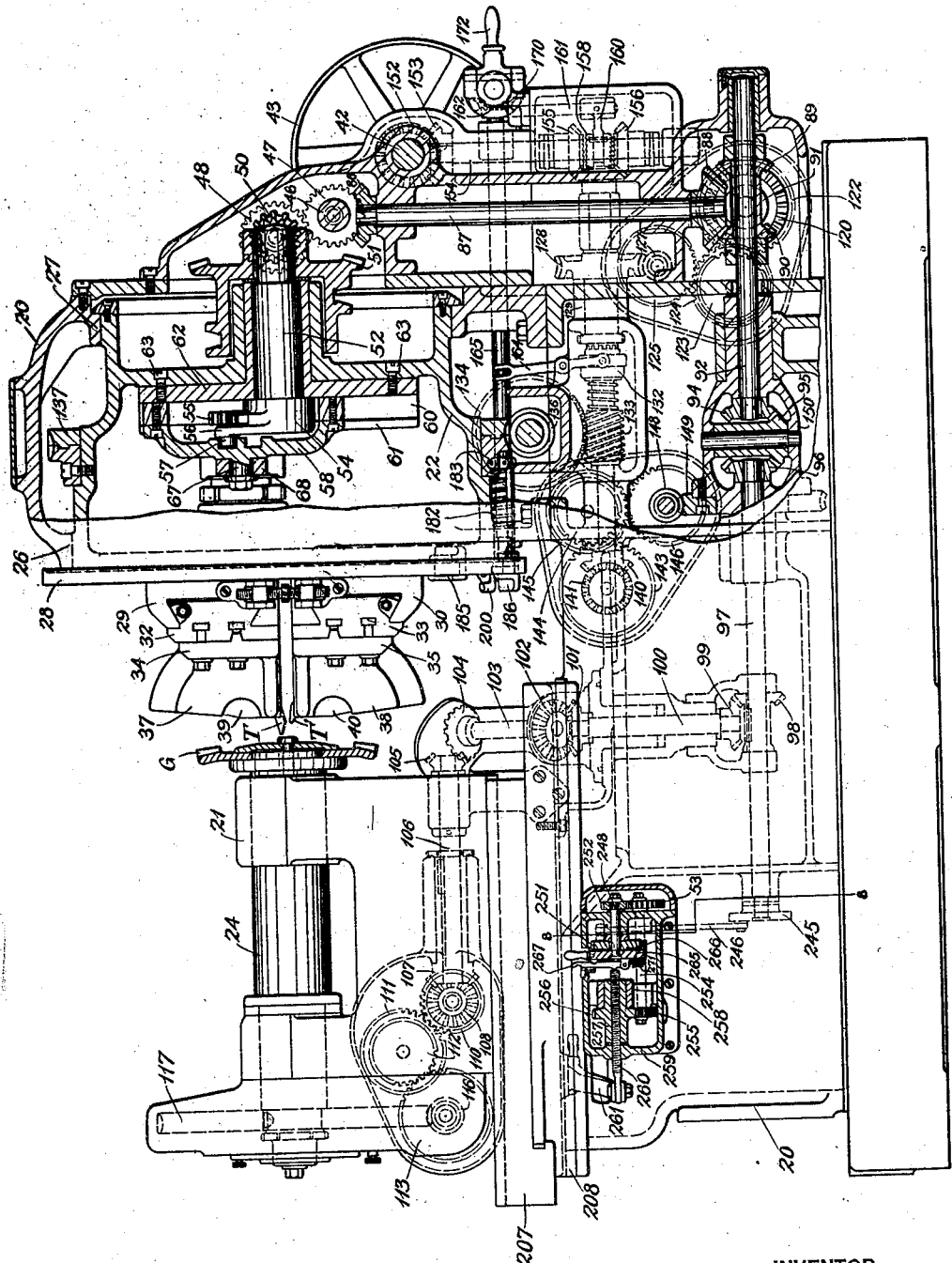
Figure 1 is a side elevation, partly in section, of a machine built according to the preferred embodiment of my invention.

In the drawings, the present invention is illustrated as embodied in a two-tool spiral bevel gear generating machine. It will be understood, however, that the basic features of this invention may be employed as well upon single tool machines and in machines for producing spur, helical, herringbone, and hypoid gears, whether these machines be of the generating type or operate without roll, that is, be of the nongenerating type.

In the machine illustrated, the tools are mounted upon slides which are reciprocated simultaneously in opposite directions by means including a device for imparting to the tool slides a motion at a uniform velocity during the cutting and return strokes and which operates to slow down the slides at either end of their strokes, reverse them, and start them gradually in the opposite direction. Through this mechanism, the tools are driven at a uniform velocity during the cut and at the same time the shock of reversal at either end of the stroke is avoided. The blank is rotated continuously on its axis, this motion combining with the uniform motion of the tools to produce the spiral character of the teeth cut and also acting to index the blank. In the machine illustrated, the tool slides are carried upon a cradle which rotates about an axis representing the axis of the imaginary crown gear or other basic gear to which the bevel gear blanks being cut are to be generated conjugate. For the generating motion, the cradle is rotated slowly and at a uniform velocity upon its axis and simultaneously an added rotational movement of the proper ratio is imparted to the blank on its axis, these two movements operating to produce a relative movement between the tools and blank corresponding to that of a bevel gear meshing with a basic crown gear or other basic gear. The generating motion being continuous acts, also, to feed the tools into full depth, during generation, without requiring any displacement of the cutter relative to the cone apex of the blank being cut. The machine illustrated may be used in roughing out blanks preliminary to a final generating operation or in cutting gears according to the formed or non-generating process. To this end, the machine is provided with a depthwise feed mechanism which can be adjusted to permit of a coarse or fine feed, as may be desired. This feed mechanism, is of course, only employed during roughing or a non-generating operation and may be readily disconnected for the generating operation.

In cutting tapered gears with this invention, it has been found preferable to so coordinate the reciprocating and clapping mechanisms for the tools that the tools cut when moving in a direction opposite to the direction of rotation of the blank, as the tooth curves produced in this way have been found to approach a logarithmic spiral in curvature, being of substantially constant spiral angle, along their length. When gears are cut in this manner, besides producing a very desirable form of tooth curve, the tool clearance angle will be substantially constant during the cut, so that the tools will operate smoothly and a very fine tooth surface finish can be attained.

Besides the features already indicated, there are embodied in the machine illustrated several meritorious mechanical improvements. A clapping mechanism is provided which will operate correctly in any position of angular adjustment of the tool slides. The clapping mechanism is so constructed, moreover, that the tools are swung to and from cutting position about axes extending substantially in the direction of the tool slides. This permits of a more compact arrangement of the tools, such as is required on a two tool machine operating according to the continuous indexing principle. The structure is simple, the tools are locked positively in cutting position and can be readily guarded. Mechanism is provided, also, for imparting to the cradle a slow generating roll in either direction and for producing a rapid return movement in either direction after the blank has been completely generated. These two cradle drives are controlled by a single operating lever in such manner that it is impossible to throw in either the fast or the slow feed drive while the other drive is in operation. With this safety control mechanism is combined, also, means for stopping the cradle when it has moved to a predetermined limit in either direction.

Both gears of a pair may be produced upon the machine illustrated, and with the mechanism already referred to. It is sometimes desirable, however, to slightly mismatch the longitudinal tooth curves of one member of the pair relative to the longitudinal tooth curves of the other member, so as to localize the bearing between the mating tooth surfaces and make the gears capable of some adjustment to meet varying conditions of mounting and to take sudden heavy loads without danger of breakage. To this end, it is within the contemplation of my invention to provide means for imparting in addition to the motions already described, an added variable motion between tools and blank. This means can be employed in cutting one member of the pair to give the teeth of that member a longitudinal curvature different from the longitudinal tooth curvature produced on the other member by the uniform motion of tool and uniform rotation of the blank alone.

Referring now to the drawings by numerals of reference, 20 indicates the base or frame of the machine, on which is mounted the work or blank head 21 and the cradle or carrier 22. Journaled in the blank head 21 is the work spindle 24 which carries the gear blank G.

The cradle 22 is mounted for rotation in circular bearings 26 and 27 (Figures 1 and 3) provided on the frame 20. The cradle is provided with a face plate 28 on which are pivotally mounted the arms 29 and 30 which carrying the reciprocable tool slides 32 and 33. Adjustable on these tool slides are the clapper block supports 34 and 35. Each of these clapper block supports carries an angularly movable clapper block, designated, respectively, at 37 and 38. Each of the clapper blocks carries an angularly adjustable tool holder designated, respectively, at 39 and 40. The tool holders carry the reciprocating planing tools T and T' respectively.

*Mechanism for reciprocating the tools*

Figures 6, 7:
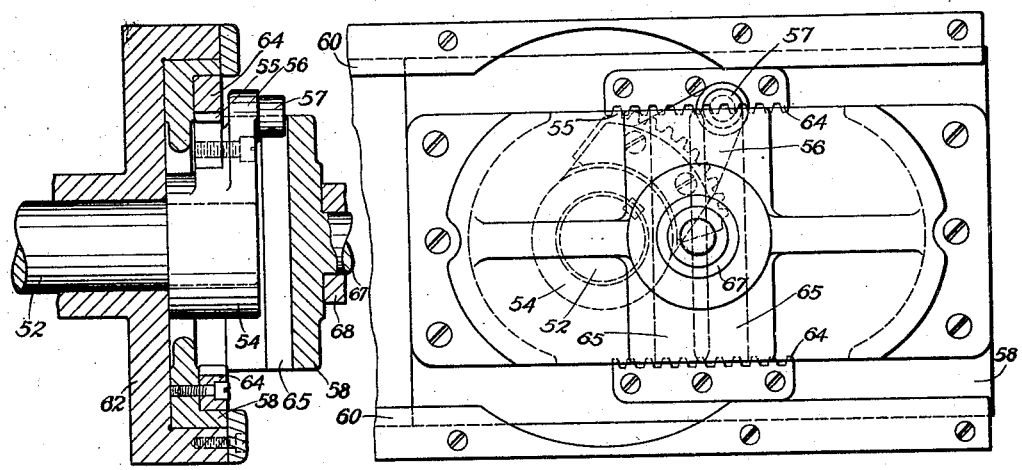
Figure 6 is a front elevation of the uniform motion slow start and stop driving mechanism controlling the reciprocatory movement of the tools.
Figure 7 is a section taken generally at right angles to Fig. 6.

Journaled in the frame of the machine is a shaft 42 (Figures 1, 3 and 13) which may be driven from a pulley 43 or from any other suitable source of power. Secured to the shaft 42 is a spur pinion 44 which meshes with a spur gear 45 which is keyed to a shaft also journaled in the frame of the machine. The gears 44 and 45 form a set of speed change gears governing the speed of reciprocation of the tools. Keyed to the shaft 46 is a spur pinion 47 which meshes with and drives a spur gear 48 which is secured to the stub shaft 49. The spur gear 48 has formed integral with it the bevel pinion 50 which meshes with and drives the bevel gear 51. This bevel gear 51 is secured to a shaft 52 which is journaled coaxially of the cradle 22. Keyed to the outer end of this shaft 52 is a combined segment and crank member designated generally at 54, (Figures 1, 6 and 7). The member 54 is keyed to and surrounds the shaft 52 and has secured to it a segmental gear 55. The member 54 is also provided with an arm 56 to which is secured at a radius greater than the radius of the teeth of the segmental gear, a crank pin 57.

The member 54 is arranged to drive a reciprocable slide member 58 which travels in guide-ways 60 formed in the head 61 of the guide member 62 which forms a bearing for the shaft 52 and is secured by the screws 63 against movement relative to the cradle.

The slide member 58 has secured to it a pair of opposed racks 64 and is provided, preferably with two transverse slots 65. The gear segment 55 is adapted to engage the racks 64 alternately and the crank pin 57 is arranged to engage the grooves 65 alternately.

Figure 2:
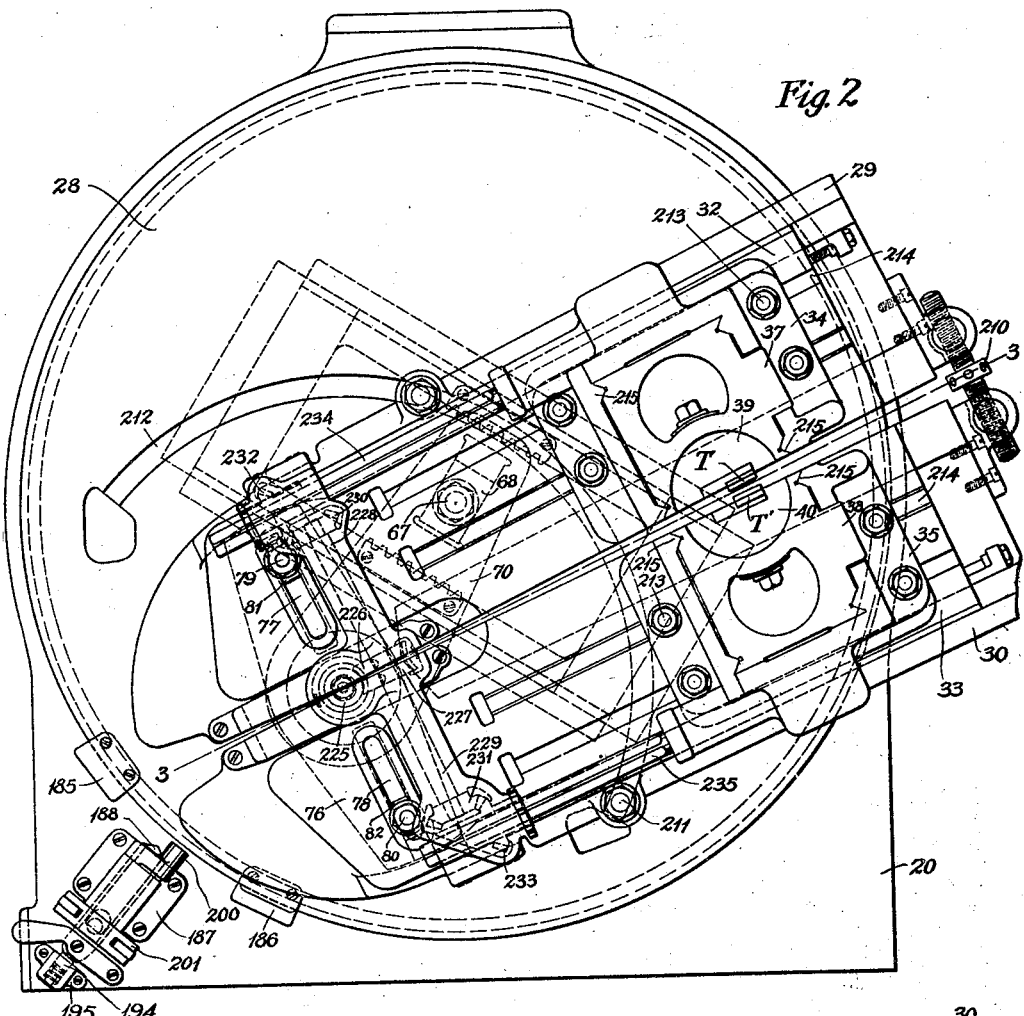
Figure 2 is a front elevation of the cradle and tool slides.
Figure 3:
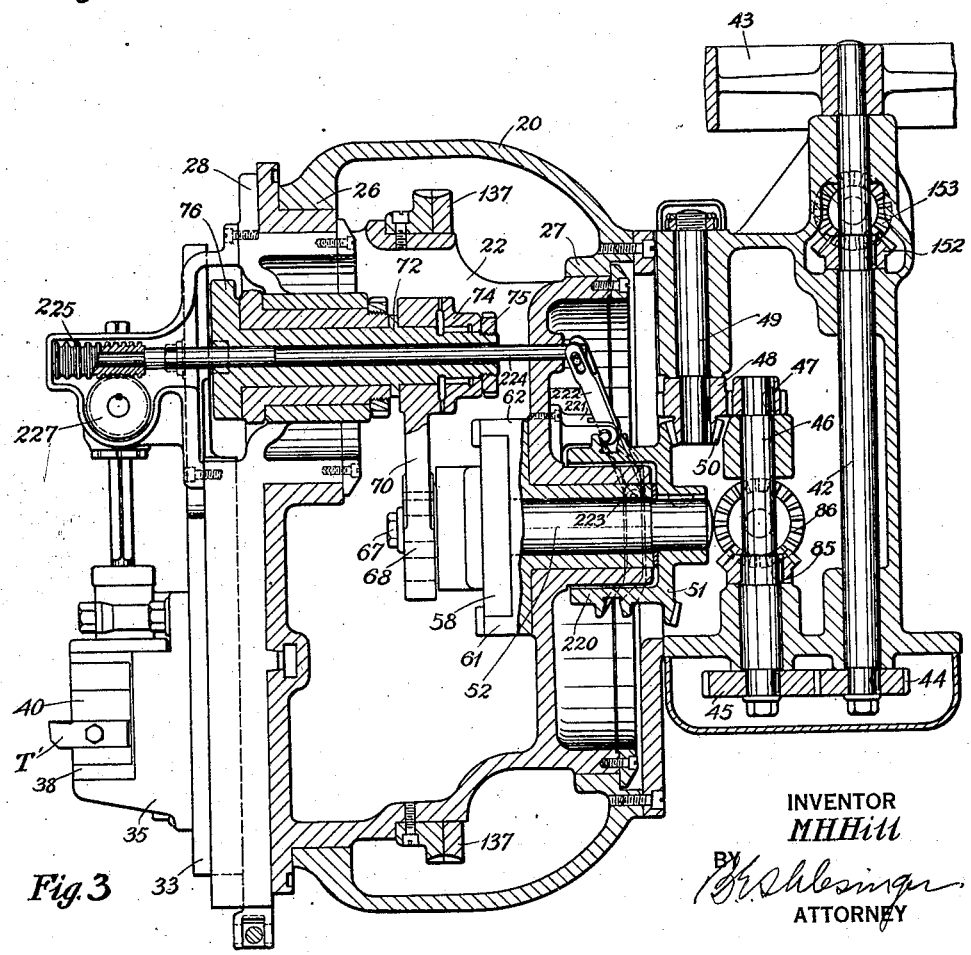
Figure 3 is a section on the line 3—3 of Figure 2.

The slide 58 carries a stud 67 which forms a pivot for the block 68 which travels in a rectangular slot 69 formed in the arm 70 (Figures 2, 3 and 13). The arm 70 is provided with a circular bore which surrounds the shaft 72 and this arm may be secured in operative engagement with the shaft 72 by means of the fine toothed clutch member 74 which is keyed to the shaft 72 and which can be brought into engagement with the clutch teeth formed on the arm 70 by means of the nut 75 which threads on the shaft 72. The shaft 72 is provided at its outer end with an enlarged head 76 which is provided with aligned slots 77 and 78. The reciprocating tool slides 32 and 33 are connected to this arm 76 by means of the pins 79 and 80, respectively, and the blocks 81 and 82, respectively, which travel in the slots 77 and 78 of the arm respectively. Through the mechanism described, the tool slides are reciprocated simultaneously in opposite directions.

The shaft 52 is driven continuously in the same direction from the shaft 42 through the gearing 44, 45, 47, 48, 50 and 51. The rotation of the shaft 52 continuously in the same direction causes the combined segment and crank member 54 to rotate continuously in the same direction. As the member 54 rotates, the segment 55 will engage one or other of the racks 64 to move the slide 58 first in one direction and then in the other at a uniform velocity. Just as the segment 55 passes out of engagement with either of the racks 64, the roller 57 of the crank arm 56 will come into engagement with one of the grooves 65 of the slide 58. Thus the crank will pick up the slide, bring it to a stop gradually, reverse it, and start it gradually in the opposite direction. Just as the roller 57 is leaving the groove 65, the segment 55 will come into engagement with the other rack 64 driving the slide 58 again at a uniform velocity. When the segment leaves this other rack, the crank pin 57 will engage the other groove 65, again bringing the slide gradually to a stop, reversing it, and starting it gradually in the original direction. The gearing is so chosen that the segment 55 drives the slide 58 during the cutting and return strokes of the tools and that the crank pin 57 comes into engagement with one or other of the grooves 65 at either end of the stroke when the tool is clear of the blank. In this way, the tools are given a uniform motion during the cut, which is highly desirable to secure a uniform tool clearance and, as will be pointed out hereafter, a uniform spiral angle on the teeth being cut. At the same time, through the intermittently operating crank mechanism the tools can be brought to a stop gradually, reversed, and started gradually in the opposite direction without the shock of reversal which would result were the tools driven entirely at a uniform velocity. The tool driving mechanism combines, hence, all the advantages of rack and crank drives, without any of the disadvantages of either.

By providing two properly-spaced slots 65 in the slide 58 to be engaged by the crank pin 57, the slide 58 will have attained the same velocity when the crank pin 57 leaves a slot 65 as that which will be imparted by the segment 55 and rack 64, and so, also, the crank drive will pick up the slide 58, just as the segment 55 is rolling out of engagement with a rack 64, at the same velocity as the slide had under actuation of the segment and rack. It is possible, however, to operate the mechanism illustrated with only one groove in the slide 58. In this case, however, the slide 58 will not have attained full speed when the roller 57 leaves the slot, so that, theoretically, at least, the operation would not be as smooth as where the slide 58 is provided with two slots, as shown.

Means for imparting to the blank its continuous uniform rotary motion

As already stated, during the operation of the machine, the blank is rotated continuously at a uniform velocity, this motion acting in conjunction with the reciprocatory motion of the tools during cutting to produce the longitudinal tooth curve and operating, also, to continuously index the blank. Secured to the shaft 46 (Figs. 1, 3, and 13) intermediate its ends is a miter gear 85 which meshes with and drives a miter gear 86 upon a vertical shaft 87, that is journaled in the frame of the machine. Keyed to the shaft 87 at its lower end is a wide-faced bevel gear 88. This gear 88 is adapted to mesh with one or other of the oppositely disposed bevel gears 89 and 90 which are secured to an axially movable sleeve 91 which may be manually shifted on the shaft 92 to bring either gear 89 or 90 into operative engagement with the gear 88. The gears 89 and 90 govern the hand of spiral of the teeth to be cut upon the blank. The sleeve 91 has a splined connection with the shaft 92.

Keyed to the shaft 92 at its outer end is a bevel gear 94 forming one of a set of differential gears 94, 95, and 96 which serve to transmit the rotation of the shaft 92 to the aligned shaft 97.

Secured to the shaft 97 intermediate its end is a miter gear 98 which meshes with a miter gear 99 that is fastened to the vertical shaft 100. Keyed to this vertical shaft 100 at its upper end is a bevel gear 101 which meshes with and drives a bevel gear 102 that is fastened to the diagonal shaft 103. The shaft 103 has fixed to it at its upper end a miter gear 104 which meshes with a miter gear 105 upon a horizontal telescoping shaft 106 which is journaled in the work head 21.

Secured to the telescoping shaft 106 at its outer end is a miter gear 107 which meshes with a miter gear 108 which is fastened to a transverse shaft 109, also journaled in the work head. Keyed to the shaft 109 at its outer end is a spur gear 110 which drives through the gears 111, 112 and 113, the worm shaft 115. Keyed to this shaft 115 is the worm 116 which meshes with and drives the worm wheel 117 which is secured to the blank spindle 24. The gears 110, 111, 112, and 113 form a set of index change gears governing the number of teeth to be cut upon the blank. Through the mechanism described, the blank is rotated on its axis continuously and at a uniform velocity.

Mechanism for imparting slow generating roll to the cradle

In order to generate tooth profiles of the gear G an added relative movement must be imparted between the tools and blank as though the blank were meshing with a basic gear represented by the tool, as, for instance, a crown gear. In the machine illustrated, the tools are mounted upon the cradle which, for generation, is rotated slowly on its axis, its axis representing the axis of the basic gear.

The slow generating roll is imparted to the cradle from the wide-faced gear 88 (Figures 1 and 13) through the bevel gear 120 which meshes with the gear 88. This bevel gear 120 is keyed to a transverse shaft 121 which has fastened to it at its outer end a spur gear 122. This spur gear 122 drives through the spur gears 123, 124, and 125 the transverse shaft 126 to which is secured the worm 127.

The worm 127 meshes with and drives a worm wheel 128 which is formed integral with a sleeve 129 that is journaled on a worm shaft 130. The worm wheel 128, and sleeve 129 can be clutched to the worm shaft 130 for operative engagement therewith, by the shiftable clutch member 132. When this clutch member 132 is in engaged position, the worm shaft 130 will be driven by the worm wheel 128. The worm shaft 130 has secured to it a worm 133 which meshes with a worm wheel 134 which is secured to the cradle worm shaft 135.

Keyed to the cradle worm shaft 135 is the worm 136 which meshes with and drives the worm wheel 137 which is fastened to the cradle 22. Through the mechanism just described the cradle may be given a slow generating rotation about its axis. The gears 122, 123, 124 and 125 constitute a set of roll feed change gears governing the speed of rotation of the cradle. By making the number of these gears even or odd the cradle can be driven in either direction.

Compensating mechanism for the cradle roll

In a machine operating according to the present invention, each tool cuts on a new tooth surface of the blank on each cutting stroke. Thus all of the teeth are finished simultaneously. A correct timed relation must be maintained at all times, therefore, between the tool reciprocations and the blank rotation. To maintain this timed relation of tool and blank movements, despite the rotation of the cradle and to impart to the blank the additional rotation which comprises part of the generating roll, a compensating mechanism must be employed. To this end, the shaft 130 has secured to it a miter gear 140 which meshes with and drives a miter gear 141 (Figures 1 and 13) which is secured to a shaft 142. The shaft 142 has fixed to it a spur gear 143 which drives through the spur gears 144, 145 and 146 the worm shaft 147. This shaft 147 has fixed to it a worm 148 which meshes with a worm wheel 149 which is secured to the housing 150 of the differential gears 94, 95 and 96. This differential housing 150 is journaled on the shafts 92 and 97 and mounted in suitable bearings provided in the frame 20, as illustrated in Figure 1. The gears 143, 144, 145 and 146 constitute a set of ratio change gears to maintain the proper relation between the blank and cradle rotation required to produce the proper generating relative movement of tools and blank. Through the mechanism just described an additional rotational movement is imparted to the blank which is combined through the differential with the uniform indexing rotation of the blank, so that the blank is given in addition a proper generating rotation and is maintained in proper timed relation with the tools despite the movement of the cradle. The gearing is so calculated as to maintain this timed relation.

Mechanism for imparting a rapid return movement to the cradle

So far, the means for reciprocating the tools and rotating the blank in timed relation and the means for imparting the slow generating rotation to the cradle in either direction have been described. The blank will be completely generated during the roll of the cradle to a predetermined angle in one direction. It is possible, to generate gears on the machine illustrated on both the up and down rolls of the cradle. It is more usual, however, to return the cradle to initial position after a generating roll has been completed in one direction and so generate all the gears to be cut during movement in the same direction. To minimize the idle time of the machine during the return roll, it is desirable to provide means for returning the cradle rapidly to its initial position. The present machine is provided, therefore, with a fast speed return drive operatable in either direction.

This fast speed drive will now be described. Secured to the pulley shaft 42 (Figures 1, 3 and 13) intermediate its ends is a miter gear 152 which meshes with and drives a miter 153 which is keyed to a vertical shaft 154. Rotatably mounted on the shaft 154 is a pair of oppositely disposed bevel gears 155 and 156. These gears are in continuous meshing engagement with a bevel gear 157 which is keyed to the worm shaft 130 through which the cradle is driven by the gearing 133, 134, 136 and 137, as already described and from which the added generating and compensating motion is imparted to the blank by the gearing 140, 141, 143, 144, 145, 146, 148, 149 and the differential 150 as already described. Either of the gears 155 or 156 may be driven from the shaft 154 to drive the bevel gear 157 and shaft 130 in either direction, at will, by engaging the sliding clutch member 158, which has a splined engagement with the shaft 154, with one or other of the gears 155 or 156.

Safety control device

To prevent the operator from throwing in the fast speed drive while the slow speed drive is engaged or vice versa, through inadvertence, a safety device is provided which absolutely prevents engagement of one of these drives while the other is in operation. This safety control device is illustrated in Figures 1, 10 and 11.

The high speed clutch 158 can be moved to engage either of the gears 155 or 156 by means of the yoke member 160 which is secured to the reciprocable rod 161 which slides in suitable guide ways in the frame. This rod 161 is provided with rack teeth 162 at its upper end.

The slow speed drive clutch 132 (Figures 1 and 13) is shifted by means of a yoke member 164 which is pivoted intermediate its ends, as shown in Figure 1 and is connected through a pin and slot connection with the reciprocable rod 165. The rod 165 slides in suitable bearings in the frame of the machine and is provided at one end with a head 166, the purpose of which will be explained hereinafter.

Journaled in a bracket 168 secured to the frame of the machine is a cylindrical member 169. This member 169 has teeth on a part of its periphery as shown at 170. The teeth 170 are adapted to engage with the teeth of the rack member 162 to reciprocate the rod 161 and shift the high speed clutch yoke 160. The cylindrical member may be rotated in either direction to shift the rod 161 in either direction by means of the handle 172. By means of the handle 172, then, rod 161 can be moved to engage the clutch 160 with either the gear 155 or the gear 156 to drive the cradle at a fast speed in either direction or to bring the clutch member 160 to netural position. The three positions of the handle are indicated in Figure 11. A spring pressed detent 174 serves to hold the handle in any of its positions.

The handle 172 is pivoted on the pin 175 for movement at right angles to its movement in the bearing 168, as indicated in Figure 10. The handle is provided with a lug 177 which is adapted, when the handle is swung from the dotted line position in Figure 10 to the full line position to engage the end of the shiftable rod 165 to move this rod longitudinally in its bearings and shift the yoke member 164 and the clutch 132 to engage this clutch with the sleeve 129 of the worm wheel 128, thus engaging the slow speed drive with the cradle.

The head 166 of the rod 165 is furcated as shown particularly in Figure 11 and in order to swing the handle 172 so as to engage the lug 177 with the end of the rod 165, the handle 172 must be moved to a neutral position with reference to its movement in its journal bearing 168. In other words, the handle 172 must be brought to the central position shown in dotted lines in Figure 11 in order to swing this handle to shift the clutch 132. In other words, the clutch 158 must be in neutral position before the clutch 132 can be engaged. The arms 179 and 180 forming the furcation of the head 166 of the rod 165 will prevent rotation of the cylinder 169 when the rod 172 lies between these arms 179 and 180 in the position shown in Figure 10 in full lines. Hence, with the arm 172 in the full line position of Figure 10, the clutch 132 is engaged, but the clutch 158 must remain disengaged. To engage the clutch 158, the arm 172 must be swung to the dotted line position of Figure 10. As soon as this is done, the rod 165 is shifted longitudinally by the spring 182, to shift the clutch 132 to neutral position, thus disengaging the slow speed feed drive. The spring 182 is held between the collar 183 and the inside face of the frame.

It will thus be seen the high speed drive cannot be engaged while the slow speed drive is in operation or vice versa.

*Mechanism for stopping the cradle*

As a further safety measure, means are provided in the present machine for throwing out the fast and slow speed clutches at either end of the cradle roll.

Secured to the face plate of the cradle (Figs. 1 and 2) are a pair of lugs or stopplates 185 and 186. Secured to the face of the frame adjacent the face plate is a bracket 187 (Figs. 2, 10 and 12) which serves as a guide for the sliding lock member 188 and also as a support or bearing for the stud 190.

The sliding lock member 188 is provided with an aperture 192 through which the slow speed clutch shift rod 165 is adapted to pass when the handle 172 is swung into the full line position of Figure 10 to engage the slow speed drive with the cradle. The lower side of this aperture is beveled to engage a kerf 193 formed in the rod 165 to lock this rod with the slow feed clutch in engaged position, the clamping slide 188 being always actuated into locking position by means of the spring pressed plunger 194 which is suitably housed in a bracket 195 secured to the frame.

Thus, when the slow speed drive is engaged, it is locked in engagement by means of the sliding lock member 188. The cradle will then roll slowly in the desired direction, the teeth being generated upon the blank. When the cradle has rolled through the angle required to completely generate the teeth, the lug 185 will engage the sliding lock member 188, which is provided with a V-shaped outer end and depress this locking member 188 against the action of the spring plunger 194. The depression of the lock member 188 releases the rod 165 which is then shifted axially by the spring 182 already referred to, to shift the clutch member 132 to neutral position, thus throwing out the slow speed cradle drive and stopping the cradle.

The slow speed clutch 132 being now in neutral position, the operator can throw in or engage the high speed clutch member 158 to return the crade rapidly to starting position. To do this, the operating handle 172 will be swung to either the upper or lower position illustrated in Figure 11, depending upon the direction of fast speed return of the cradle. The cylindrical member 169 which is thus swung is provided with a pair of lugs or projections 197 and 198 shown in Figures 10 and 11.

The stud 190, already referred to, which is journaled in the bracket 187 (Figs. 2, 10 and 12) is provided at its upper end with an arm 199 formed with an outwardly projecting stud or lug 200. Secured to the lower end of the stud 190 is an arm 201 which may be secured selectively, dependent on the direction of movement of the cradle, to either of the links 202 and 203 by means of the pin or screw 204. The links 202 and 203 pass through slots formed in the frame and are secured to the floor 183, previously referred to, which is secured to the slow speed clutch shift rod 165.

When the cradle has returned to starting position under actuation of the rapid return drive, the lug 186 will engage the lug 200 and rotate the stud 190 on its axis to move the arm 201 and the link 202 or 203 to pull the collar 183 and rod 165 forward against the action of the spring 182. As the rod 165 moves forward the head 166 will engage the lug 197 or 198, depending upon the position of the handle 172 (Fig. 11) to force the handle 172 back to neutral position and thus shift the clutch 158 back to neutral position disengaging the fast feed return drive and stopping the machine.

The two links 202 and 203 are provided so that the clutch disengaging mechanism may be operated at either the end of the up or down roll. It will be understood, of course, that the lugs 185 or 186 may be transposed to provide for stopping of the machine in event the generating and return roll takes place in the opposite direction from that illustrated in the drawing.

Through provision of this safety stopping mechanism, the machines will take care of themselves and one operator can attend a number of machines simultaneously.

Tool and blank adjustments

The blank spindle, as already described, is journaled in a work head 21. This work head is slidably adjustable upon the work head carrier 207 (Fig. 1) so that the blank can be moved axially to position it at the proper cone apex distance. The work head carrier 207 is, in turn, angularly adjustable upon the slide or carriage 208, this angular adjustment being for the purpose of positioning the blank into the proper tangential plane for operation upon by the tools. In this angular adjustment, the work head carrier 207 swings about the axis of the vertical shaft 100. The slide or carriage 208 is movable toward the tools for the purpose of feeding the blank into engagement with the tools during the roughing operation or when the blank is to be produced in a forming or non-generating process. The mechanism by which this feed movement is attained will be described later.

The arms 29 and 30 supporting the tool slides (Fig. 2) are angularly adjustable about the axis of the shaft 72 (Fig. 3). The axis of this shaft is offset from the axis of the cradle and by opening or closing the arms, therefore, the tools can be adjusted to move in converging paths offset from the axis of the cradle. The arms can be adjusted relatively to each other by rotating a screw 210 which is provided with oppositely threaded ends which thread into swivel nuts mounted upon the arms. The arms can be secured in any adjusted position by means of the T-bolts 211 which engage in the circular slot 212 formed in the face plate 28. The slides 32 and 33 reciprocate in guide ways formed in the arms 29 and 30, respectively as already described. Gibs are provided for taking up wear. The clapper block carriers 34 and 35 are adjustable, respectively, upon the slides 32 and 33 for the purpose of positioning the tools according to the cone apex distance of the gear to be cut. These clapper block carriers may be secured in any adjusted position by means of the bolts 213 which engage in T-slots 214 provided therefor in the face of the tool slides.

Tool clapping mechanism

Figures 4, 5:
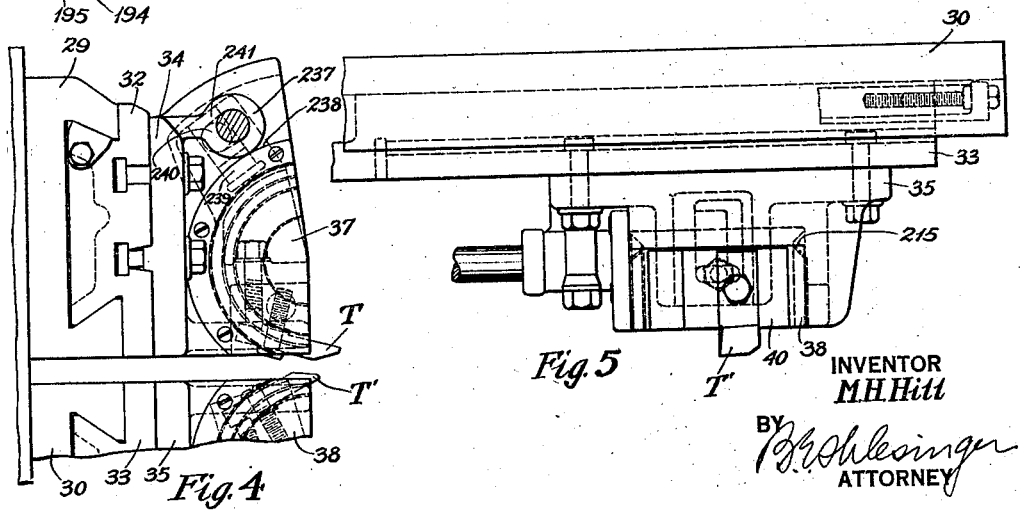
Figure 4 is a side elevation of the tool mechanism, with the lower tool slide, arm, and clapper block partly broken away.
Figure 5 is a plan view of a clapper block and tool slide.

The clapper blocks themselves are of novel construction. The clapper block carriers 34 and 35 (Figs. 2, 4 and 5) are provided with arcuate V-shaped guides 215 curved longitudinally about axes extending substantially in the direction of movement of the tool slides. The clapper blocks 37 and 38 are provided with correspondingly shaped grooves, so that the clapper blocks are movable to bring the tools to and from cutting position, about axes extending substantially in the direction of movement of the tool slides.

Angularly adjustable upon each clapper block, as already stated, are the tool blocks 39 and 40, which may be tilted to position the tools at the proper angle for cutting clearance. The clapping mechanism is actuated from the cam 220 (Fig. 3) which is secured to or formed integral with the bevel gear 51. This bevel gear 51 is driven continuously in the same direction from the pulley shaft 42 through the gearing 44, 45, 47, 48 and 50, already described. Thus the cam 220 rotates continuously in the same direction. Pivoted intermediate its ends upon a bracket 221 secured to the cradle is a lever arm 222. This lever arm carries at one end a roller 223 which engages in the slot of the cam 220. At its other end, this lever arm 222 is connected to the rod 224 which slides in a bore formed in the shaft 72.

Secured to the slide rod 224 at its outer end is a cylindrical rack member 225. This member might be described, also, as a worm without lead. Meshing with this cylindrical rack member 225 are a pair of worm wheels 226 and 227, (Fig. 2). One of these worm wheels 226 is secured to a shaft 228 and the other 227 is secured to a shaft 229. The shafts 228 and 229 are journaled, respectively, in the arms, 29 and 30. The shaft 228 has secured to its upper end a bevel gear 230 and the shaft 229 has secured to its lower end a bevel gear 231. The bevel gears 230 and 231 mesh, respectively, with bevel gears 232 and 233 secured, respectively, to splined shafts 234 and 235.

Each of the shafts 234 and 235 has secured to it a crank member (Fig. 4) only one of which 237 is shown. These members, however, are of identical construction. Each of the clapper blocks 37 and 38 is provided with an extension or arm 238 and each of these extensions or arms is formed a rectangular slot 239. Swivelly connected to the crank pin 240 of each of the crank members 237 are blocks 241 which are adapted to travel in the slots 239.

It will be seen, then, that as the cam 220, rotates the lever arm 222 will be oscillated to reciprocate the rod 224 and cylindrical rack 225. The reciprocation of this cylindrical rack member 225 will cause the worm wheels 226 and 227 to oscillate and oscillate the shafts 228 and 229 and through the gearing 230, and 232 and 231 and 233, respectively, the shafts 234 and 235. As the shafts 234 and 235 oscillate the crank members 237 will be oscillated and through the pin and block connections 240—241, the clapper blocks 37 and 38 will be oscillated to move the tools T and T' to and from cutting position.

In the machine illustrated, the clapping mechanism is absolutely coordinated with the mechanism for reciprocating the tools so that the tools will be clapped to and from cutting position in proper timed relation with the reciprocation of the tool slides. The gears 232 and 233 are in opposed relationship to their respective mating gears 230 and 231, so that the tools will be moved alternately to and from cutting position. With this arrangement, the tools T and T' will cut alternately, while moving in the same direction, upon opposite side tooth surfaces of the blank.

The crank and block mechanism for swinging the clapper block is simple, requires a minimum of parts and is self-locking, the clapper block being held by this mechanism absolutely against movement in cutting or out of cutting position during the cutting or return strokes of the tools, respectively. Hence, with this mechanism no additional locking means for limiting the movement of the clapper blocks in either direction is necessary.

By employing an actuating member such as the cylindrical rack 225, it is possible to adjust the tool arms about their common pivotal axis without disturbing the coordination between the tools themselves and the mechanism for reciprocating the tool slides.

Feed mechanism for blanks

The present machine can be used for roughing as well as finishing and for producing gears without roll, also, as stated above. For the roughing operation and for producing gears without roll, a relative depthwise feed movement must be imparted between the tools and blank. In the present machine, the blank is fed relative to the tools by moving the carriage 208 (Figs. 1 and 8) on the bed or frame 20.

Secured to the shaft 97 at its outer end is a crank disc 245. Secured to this crank disc 245 is a connecting rod 246 which is pivoted to an arm 247. The arm 247 is journaled intermediate its ends upon a shaft 248. Pivoted to the outer end of the arm 247 is a pawl 250. This pawl 250 is adapted to engage a ratchet wheel 251 which is keyed to the shaft 248. Secured to the shaft 248 at one end is a spur gear 252 which meshes with a spur gear 253 upon a countershaft 254.

Secured to the counter-shaft 254 is a spur pinion 255 which meshes with a spur gear 256 that is formed integral with a nut 257. The nut 257 is held against longitudinal movement between a bearing 258 and the end wall of the housing 259 which encloses the feed control mechanism.

The nut 257 is in threaded engagement with a screw 260. This screw 260 is pivotally connected to a lever arm 261 (Figs. 1 and 8) which is pivoted at its outer end on a pin 262 threaded into the frame 20 of the machine. The lever 261 is connected intermediate its ends by means of the stud 263 with the slide 208.

From the preceding description, it will be seen that as the shaft 97 and crank disc 245 rotate, an intermittent rotation will be imparted to the ratchet wheel 251 from the pawl 250. This intermittent rotation will be transmitted through the gears 252, 253, 255 and 256 to the nut 257 to rotate the screw 260 and move the blank toward or from the tools to feed the blank into full depth.

A control device is provided for the feed mechanism to govern the amount of feed for each rotation of the crank disc 245. Through this control mechanism, a coarse or a fine feed can be obtained. This control device includes a disc 265 which is provided with a guard plate 266 and a locking lever 267 which is pivoted, as shown in Figure 1 between ears provided on the face of the disc 265. The guard plate 266 of the disc 265 extends over the teeth of the ratchet wheel 251, but extends around only a portion of the periphery of the disc 265. Both the disc 265 and the locking lever 267 are provided with hand grips. The disc 265 is rotatably mounted upon the shaft 248 and is maintained in fixed relation to the locking lever 267 by means of the ears or lugs 268 which extend from the face of the disc 265 on either side of the locking lever 267 as shown clearly in Figures 1 and 9.

The disc 265 is provided with graduations on its periphery, so that the disc and locking lever 267 can be set to permit of any desired amount of feed per rotation of the crank disc 245. In the normal or zero position of the disc 265, the guard plate 266 acts as a deflector preventing engagement of the pawl 250 with the ratchet wheel 251 and rendering the feed mechanism inoperative. In setting the disc 265 for a predetermined feed, the operator will grasp the hand grip of the locking lever 267 and the disc 265 and swing the locking lever and disc about the axis of the shaft 248 to position the guard plate 266 as to expose one or more teeth of the ratchet wheel 251. Each time the pawl 250 engages the ratchet wheel, it will rotate it through an angle equal to the number of teeth exposed. Thus, by properly adjusting the disc 265 a coarse or a fine feed can be obtained, as may be desired.

When the disc 265 has been rotated by the operator to the desired position, the lock lever 267 is released to permit it to engage under actuation of the spring 270 with one of the notches 269 formed by serrated edge of the slot provided in the housing 259, through which the hand grips of the locking lever and disc 265 pass.

In setting up a machine for roughing or for producing a gear in a formed or non-generating process the carriage 208 will be backed off the amount desired for the feed movement by rotating the shaft 248 or the counter-shaft 254 by hand, as by means of a wrench or other suitable tool, so that after the work head carrier 207 has been angularly adjusted about the axis of the shaft 100 to position the face surface of the gear into the cutting plane of the tools, the blank will receive the proper depthwise feed movement under actuation of the feed mechanism. The disc 265 is continuously urged to return to zero position by the coil spring 271 which is connected at one end to the disc and at the other end to a lug provided on the housing 259. As the shaft 97 and crank disc 245 rotate, an intermittent rotational movement will be imparted to the ratchet wheel 251 through an angle depending upon the position of the disc 265 and guard plate 266. This intermittent rotational movement will be transmitted through the gears 252, 253, 255, and 256 to the nut 257 as already described to move the screw 260 and thus impart a feed movement to the carrier 208 and to the blank mounted thereon. When full depth cutting position has been reached, that is when the tools cut on the root line of the teeth, the screw 260 will have been moved far enough forward that its end contacts with a nose provided on the locking lever 267, as shown in Figure 1, to disengage the locking lever 267 from locking position. As soon as the locking lever is disengaged, it and the disc 265 will be returned to zero position by the spring 271 thus moving the guard plate 266 into position to deflect the pawl 250 and prevent further feed.

*Preferred method of cutting tapered gears*

As has already been indicated, in cutting tapered gears with this invention, and in this term is included crown gears, namely, gears having a cone angle of 90°, the tools are moved in straight paths offset from the axis of the cradle and the apex of the blank. It has been found that any desired spiral angle can be obtained by changing the offset of the tool paths. In addition, it has been found preferable to move the tools during their cutting stroke in a direction opposite to the direction of rotation of the blank. When this latter method of cutting is combined with the movement of the tools in an offset path, it has been found a tooth curve can be produced upon the blank of substantially constant spiral angle along its length and that during the cut the tool clearance angle will be substantially constant, so that a very smooth tooth surface finish can be obtained.

The advantages of this preferred system of cutting are clearly demonstrated in Figure 14. O represents the center of the crown gear or axis of the cradle. The line A represents the straight line path of the tool or tools, which path is, as stated, offset from the axis of the cradle or center of the crown gear. E represents the offset circle and R its radius. As has been stated, the tool or tools move at a uniform velocity while cutting. The equally spaced points $a$, $b$, $c$, etc. on the line A indicate, therefore, successive positions of the tool at equal intervals of time, during cutting.

The blank moves also at a uniform velocity, rotating continuously on its axis. The equally spaced positions, 1, 2, 3, etc. on the circle B of the straight line tangent to the circle E indicate, therefore, the relative positions of the line A on the crown gear during the continuous uniform rotational movement on the blank. The intersection of the circles F, T, U, V, W, X, Y, Z and B, giving the radial distances of the tool, with the lines tangent to the offset circle E, giving the angular positions of the tool path due to the rotation of the blank, give the resulting relative spiral path or curve produced on the blank. If the tool is moved at a uniform velocity along the line A in the same direction as the direction of rotation of the blank and so that its linear cutting velocity equals the linear velocity of the blank, (the linear velocity of the offset circle E,) the spacing of the tool positions on the line A will be equal to the corresponding lengths of arcs on the circumference of the offset circle E and the resulting curve produced on the blank will be a true involute of the circle E, such as the curve C indicated in the figure. It will be understood, of course, that the proportions are exaggerated in the figure for the sake of clearness.

If the angular velocity of the blank is slower or faster than the linear velocity of the tool and the tool is moving in the same direction as the direction of rotation of the blank, curves of the type indicated at D and F will be produced, respectively, on the blank which are, respectively, abridged and extended modified involutes.

The curves C, D and F are curves of rapidly increasing spiral angle away from the base circle E and cross the line A at very steep angles. These curves ordinarily are undesirable not only because of the rapid increase in spiral angle which causes added thrusts of the gears produced, but particularly, also, because of the considerable variation in tool clearance angle along the cut.

It has been discovered, however, that if the blank is rotated in the opposite direction to the direction of the tool movement, as indicated by the equally spaced angular positions 1', 2', 3', 4' etc. of the line A and the tool and blank are moved with relative velocities such as occur when a tool makes successive strokes on successive teeth of a rotating gear, a curve of the form H will be produced upon the blank. This curve crosses the line of tool motion A at a comparatively small angle due to the relatively slow rotation of the blank.

The spiral angle of the curve H can be changed at will by offsetting the tool path more or less, but in any case, by a proper selection of relative velocities, the spiral angle can be kept substantially constant along the whole length of the tooth, the curve approaching in this respect, a logarithmic spiral. The form of curve H is therefore desirable, not only from the standpoint of the gears actually produced, but particularly, also, because the tool clearance angle will be substantially constant during the cut and a very smooth tooth surface finish can be obtained.

Method of mis-matching tooth curves of mate gears

With the present invention, gears can be produced whose mating tooth surfaces along their lengths are truly complementary one to the other. It is usually desirable, however, because of the difficulty of securing perfect mountings and to avoid any danger of breakage under sudden heavy loads, to mis-match the longitudinal tooth curves of one gear relative to that of its mate so as to obtain a concentrated bearing between the tooth surfaces of the gears and consequent possibility of adjustment or adaption in the gears to varying conditions of mountings and loads.

With the present invention, the longitudinal tooth curves of one gear can be cut different from the longitudinal tooth curves of the mate gear to mis-match those curves, by imparting between tool and blank an added variable motion. One form of mechanism for producing this added variable motion is illustrated in dotted lines in Fig. 13. This mechanism is shown in dotted lines, because it will ordinarily be employed in cutting one member of the pair only and may be disengaged from operation when the other member is being cut.

In this figure, 275 designates a crank. This crank can be rotated from the shaft 92 by means of the gears 276 and 277. The crank may be connected by a pin and block with a slide 278, the block traveling in a slot formed in the slide. The slide 278 is provided with arms 279 which engage the worm 148, so that as the crank rotates the worm, which will be splined to the shaft 147, will be moved axially at a variable velocity. Through this mechanism, an added motion of a true harmonic nature will be imparted to the blank. As the mate gear will preferably be cut without this added variable motion, the longitudinal tooth curves produced upon the two gears will be different one from the other and the two gears will be capable of adjustment in mesh. It will be understood, of course, that any other suitable means may be employed for mis-matching the tooth surfaces of the mating gears if desired.

While the present invention has been described particularly with reference to a machine for generating bevel gears, it is to be understood that this invention is applicable also to the production of other types of gears, as spur, helical, herringbone, and hypoid, whether generated or non-generated. In the cutting of spur, helical and herringbone gears, the tools will preferably be reciprocated in a plane parallel to the blank axis, while in the cutting of hypoid gears the axis of the blank, in the case of at least one member of the pair, will be offset from the axis of the cradle.

In general, it may be said that while the present invention has been described in connection with a specific structure and in connection with specific uses for said structure, it is to be understood that the invention is capable of various further modifications and uses and that this application is intended to cover any adaptations, uses, or embodiments of the present invention, following, in general, the principles of the invention and including such departures from the present disclosure as come within known or customary practise in the gear art and as may be applied to the essential features hereinbefore set forth and as fall within the scope of the invention or the limits of the appended claims.

Having thus described my invention, what I claim is:

1. The method of producing a tapered gear which consists in cutting its side tooth surfaces by moving a tool across the face of a continuously rotating gear blank at a uniform velocity in a straight line offset from the blank apex.

2. The method of producing a tapered gear which consists in cutting its side tooth surfaces by moving a tool across the face of a continuously rotating gear blank at a uniform velocity in a straight path offset from the blank apex while imparting a relative generating movement between the tool and blank.

3. The method of producing a tapered gear which consists in cutting its side tooth surfaces by moving a tool across the face of a continuously rotating gear blank at a uniform velocity in a straight line offset from the blank apex and in a direction opposite to the direction of rotation of the blank.

4. The method of producing a tapered gear which consists in cutting its side tooth surfaces by moving a tool across the face of a continuously rotating gear blank at a uniform velocity in a straight path offset from the blank apex and in a direction opposite to the direction of rotation of the blank, while simultaneously producing a relative generating motion between the tool and blank.

5. The method of producing a gear which consists in cutting its side tooth surfaces by moving a tool across the face of a gear blank at a uniform velocity while imparting to the blank a continuous indexing rotation and simultaneously producing an added motion at a variable velocity between tool and blank to produce lengthwise tooth surfaces on the blank which will mis-match the mating tooth surfaces of a mate gear.

6. The method of producing a tapered gear which consists in cutting its side tooth surfaces by moving a tool across the face of a gear blank at a uniform velocity in a straight path offset from the blank apex while imparting to the blank a continuous indexing rotation and simultaneously producing an added motion at a variable velocity between the tool and blank to produce lengthwise tooth surfaces on the blank which will mis-match mating tooth surfaces of a mate gear.

7. The method of producing a tapered gear which consists in cutting its side tooth surfaces by moving a tool across the face of a tapered gear blank at a uniform velocity in a straight path offset from the blank apex while imparting to the blank a continuous indexing rotation and simultaneously producing an added motion at a variable velocity between the tool and blank to produce lengthwise tooth surfaces on the blank which will mismatch mating tooth surfaces of a mate gear and simultaneously producing a relative generating motion between the tool and blank.

8. The method of producing a tapered gear which consists in cutting its side tooth surfaces by imparting to a blank a continuous indexing rotation while moving a tool across its face at a uniform velocity in a path offset from the blank apex and in a direction opposite to that of the rotation of the blank and simultaneously imparting to the blank an added rotational movement at a variable velocity to cause lengthwise tooth surfaces to be cut on the blank which will mismatch mating tooth surfaces of a mate gear.

9. The method of producing a pair of tapered gears which consists in cutting the side tooth surfaces of one member by imparting to a tapered gear blank a continuous indexing rotation while moving a tool across its face at a uniform velocity in a path offset from the blank apex and in a direction opposite to that of the direction of rotation of the gear blank and cutting the side tooth surfaces of the mate gear by imparting to a tapered gear blank a continuous indexing rotation while moving a tool across its face at a uniform velocity in a path offset from the blank apex and in a direction opposite to that of the rotation of the gear and simultaneously imparting to the blank an added rotational movement at a variable velocity to cause the tooth surfaces produced on the latter blank to mismatch the mating tooth surfaces of its mate gear.

10. The method of producing a tapered gear which consists in reciprocating a pair of tools across the face of a tapered gear blank at a uniform velocity in straight paths converging in a point offset from the blank apex while rotating the blank continuously on its axis.

11. The method of producing a tapered gear which consists in imparting to a tapered gear blank a continuous rotary motion on its axis while reciprocating a pair of tools at a uniform velocity across the face of the blank in straight paths converging in a point offset from the blank apex, the cutting strokes of the tools taking place while the tools are moving in a direction opposite to the direction of rotation of the blank.

12. In a machine for producing gears, a pair of reciprocable tool slides, a movable clapper block carried by each slide, a tool mounted on each clapper block, a pair of pivotable arms, one for each slide, mounted for adjustment about a common axis to permit positioning the tools for movement in converging paths, means for reciprocating the tool slides, and means for periodically moving the clapper blocks to move the tools to and from cutting positions, comprising an axially reciprocable cylindrical rack, the axis of which coincides with the pivotal axis of said arms, a pair of worm wheels mounted one on each arm and each meshing with said cylindrical rack, means operatively connecting each worm wheel with a clapper block and means for periodically reciprocating said cylindrical rack.

13. In a machine for producing tapered gears, means for imparting a continuous indexing rotation to the blank and means for moving the tools at a uniform velocity across the face of the blank in a path offset from the blank apex.

14. In a machine for producing tapered gears, means for imparting a continuous indexing rotation to the blank, means for moving the tool at a uniform velocity across the face of the blank in a path offset from the blank apex, and means for simultaneously producing a relative generating movement between the tool and blank.

15. In a machine for producing tapered gears, means for imparting to the blank a continuous indexing rotation, means for moving the tool at a uniform velocity during cutting in a path offset from the blank apex and in a direction opposite to the direction of rotation of the blank and means for simultaneously producing a relative generating motion between the tool and blank.

16. In a machine for producing tapered gears, means for imparting a continuous indexing rotation to the blank and means for moving the tool at a uniform velocity during cutting in a path offset from the blank apex and in a direction opposite to the direction of rotation of the blank.

17. In a machine for producing gears, means for imparting a continuous indexing rotation to the blank, a pair of reciprocating tools adapted to operate on opposite side tooth surfaces of the blank and each adapted to operate during its movement in one direction and to be clapped out of engagement with the blank on its return stroke, and means for reciprocating the tools simultaneously in opposite directions.

18. In a machine for producing tapered gears, means for imparting a continuous indexing rotation to the blank, a pair of reciprocating tools adapted to operate on opposite side tooth faces of the blank and each adapted to operate during its movement in one direction and to be clapped out of engagement with the blank on its return stroke, and means for reciprocating the tools simultaneously in opposite directions and in converging paths.

19. In a machine for producing tapered gears, means for imparting a continuous indexing rotation to the blank, a pair of reciprocating tools adapted to operate on opposite side tooth faces of the blank and each adapted to operate during its movement in one direction and to be clapped out of engagement with the blank on its return stroke and means for reciprocating the tools in opposite directions and in converging paths offset from the blank apex.

20. In a machine for producing gears, means for imparting to the blank a continuous indexing rotation, a pair of reciprocating tools adapted to operate on opposite side tooth faces of the blank and each adapted to operate during its movement in one direction and to be clapped out of engagement with the blank on its return stroke, and means for moving the tools simultaneously in opposite directions and at a uniform velocity during cutting.

21. In a machine for producing tapered gears, means for imparting a continuous indexing rotation to the blank, a pair of reciprocating tools adapted to operate on opposite side tooth faces of the blank and each adapted to operate during its movement in one direction and to be clapped out of engagement with the blank on its return stroke and means for reciprocating the tools simultaneously in opposite directions in paths offset from the blank apex and at a uniform velocity during cutting.

22. In a machine for producing tapered gears, a rotatable blank support, a pair of reciprocating tools adapted to operate on opposite side tooth surfaces of the blank and each adapted to operate during movement in one direction and to be clapped out of engagement on its return stroke, means for imparting to the blank a continuous indexing rotation, means for simultaneously reciprocating the tools in opposite directions in converging paths offset from the blank apex, and clapping mechanisms for the tools, the reciprocating and clapping mechanisms being so coordinated that each tool is moving during its cutting stroke in a direction opposite to the direction of the rotation of the blank.

23. In a machine for producing tapered gears, a rotatable blank support, a pair of reciprocating tools adapted to operate on opposite side tooth surfaces of the blank and each adapted to operate on the blank during its movement in one direction and to be clapped out of engagement with the blank on its return stroke, means for imparting to the blank support a continuous indexing rotation, and means for simultaneously reciprocating the tools in opposite directions in converging paths offset from the blank apex including means for causing the tools to move at a uniform velocity during cutting, each tool moving during the cutting stroke in a direction opposite to the direction of rotation of the blank.

24. In a machine for producing gears, means for imparting a continuous indexing rotation to the blank, a pair of tool slides, a tool mounted on each slide, one of which is adapted to operate on one side tooth surface of a gear blank and the other on the opposite side tooth surface thereof, mechanism for reciprocating said slides simultaneously in opposite directions operative to impart to each slide during the cutting portion of its stroke a motion at a uniform velocity and to bring said slides to a gradual stop, reverse them and start them gradually in the opposite direction at the two ends of the motion, and means for clapping the tools to and from cutting position operative to move the two tools alternately to and from cutting position whereby the tools cut alternately on movement of the slides in opposite directions.

25. In a machine for producing gears, means for imparting a continuous indexing rotation to the blank, a pair of tool slides, a tool mounted on each slide, one of which is adapted to operate on one side tooth surface of a gear blank and the other on the opposite tooth surface thereof, means for reciprocating said tool slides simultaneously in opposite directions and with the same velocity while moving in one direction as in the other, and means for clapping the tools to and from cutting position operative to move said tools alternately to and from cutting position whereby the tools cut alternately on movement of the slides in opposite directions.

26. In a machine for producing tapered gears, a rotatable blank support, a reciprocable tool, means for imparting a continuous indexing rotation to the blank support, and means for reciprocating the tool in a path offset from the blank apex comprising mechanism for bringing the tool to a stop gradually at either end of its stroke, reversing its direction, starting it gradually in the opposite direction and then moving it at a uniform velocity.

27. In a machine for producing tapered gears, means for imparting a continuous indexing rotation to the blank, a reciprocable tool adapted to operate during movement in one direction and to be clapped out of engagement with the blank on the return stroke, and means for reciprocating the tool in a straight path offset from the blank apex comprising mechanism for bringing the tool gradually to a stop at either end of its stroke, reversing it, and starting it gradually in the opposite direction and then moving it at a uniform velocity, and clamping mechanism for the tool, the reciprocating and clapping mechanisms being so coordinated that the tool operates on the blank during movement in a direction opposite to the direction of rotation of the blank.

28. In a machine for producing gears, means for imparting a continuous indexing rotation to the blank, a reciprocable tool, and means for reciprocating said tool including a slidable member provided with opposed racks and a groove extending transversely of said racks, a combined rotatable gear segment and crank member, said gear segment being adapted to engage said racks alternately to move the slide at a uniform velocity in opposite directions and said crank member carrying a roller adapted to engage said groove as the gear segment rolls clear of a rack so as to bring the tool to a stop gradually, reverse it, and start it gradually in the opposite direction, and means operatively connecting said slidable member to the tool to reciprocate the tool.

29. In a machine for producing tapered gears, means for imparting a continuous indexing rotation to the blank, a reciprocable tool, means for positioning the tool so that it moves in a straight path offset from the blank apex, and means for reciprocating the tool including a slidable member provided with opposed racks and a pair of grooves extending transversely of said racks, a combined rotatable gear segment and crank member, said segment being adapted to engage the rack alternately to move the slide at a uniform velocity in opposite directions and said crank member being provided with a roller adapted to engage in said grooves alternately as the segment rolls clear of either rack thereby to bring the tool to a gradual stop, reverse it, and gradually start it in the opposite direction, and means operatively connecting said slidable member to the tool to reciprocate the same.

30. In a machine for producing tapered gears, means for imparting a continuous indexing rotation to the blank, a reciprocable tool adapted to cut during movement in one direction and be clapped out of cutting position on its return stroke, means for positioning the tool so that it moves in a straight path offset from the blank apex, and means for reciprocating the tool including a slidable member provided with opposed racks and a pair of grooves extending transversely of said racks, a combined rotatable gear segment and crank member, said segment being adapted to engage the racks alternately to move the slidable member at a uniform velocity in opposite directions and said crank member being provided with a roller adapted to engage in said grooves alternately as the segment rolls clear of either rack, thereby to bring the tool to a gradual stop, reverse it, and gradually start it in the opposite direction, and means operatively connecting said slidable member to the tool to reciprocate the same, and clapping mechanism for the tool, said reciprocating mechanism and clapping mechanisms being so coordinated that the tool cuts during movement in a direction opposite to the direction of rotation of the blank.

31. In a machine for producing tapered gears, means for imparting a continuous indexing rotation to the blank, and tool mechanism including a reciprocable slide provided with opposed racks and a pair of grooves extending transversely of said racks, a combined rotatable gear segment and crank member, said segment being adapted to engage the racks alternately to move the slide at a uniform velocity in opposite directions and said crank member being provided with a roller adapted to engage said grooves alternately to bring the slide to a gradual stop, reverse it, and start it gradually in the opposite direction, a spindle, an arm secured to said spindle and provided with a radial slot, a block slidable in said slot and connected to a pin on said slide, an actuating member carried by the spindle and provided with a pair of aligned slots, a block slidable in each of the last named slots and a pair of reciprocating tool slides connected to said blocks.

32. In a machine for producing gears, a reciprocable tool slide, a clapper block movably mounted on the slide, a tool secured in said clapper block and means for moving the clapper block about an axis substantially parallel to the direction of movement of said slide to move the tool to and from cutting position.

33. In a machine for producing gears, means for imparting a continuous indexing rotation to the blank, a reciprocable tool slide, a clapper block movably mounted on the slide, a tool secured in the clapper block and means for moving the clapper block about an axis substantially parallel to the direction of movement of said slide to move the tool to and from cutting position.

34. In a machine for producing gears, a reciprocable tool slide provided with circular arc guide ways curved about an axis substantially parallel to the direction of movement of said slide, a clapper block having a correspondingly curved bearing portion, and means for moving said clapper block in said guide ways to move the tool to and from cutting position, comprising an arm connected to said clapper block and provided with a rectangular slot, a rotatable crank, and a block connected to said crank and slidable in said slot.

35. In a machine for producing gears, a blank support, a tool support, a cradle upon which one of said supports is mounted, means for imparting a cutting movement to the tool, means for imparting to the blank support a combined continuous indexing and generating rotation, means for rotating the cradle on its axis in either direction at a relatively slow speed, means for rotating the cradle on its axis in either direction at a relatively fast speed, and a single control device movable in one plane to control the application of the slow speed drive and movable in a plane at right angles to the first plane to control the application of the fast speed drive.

36. In a machine for producing gears, means for imparting a continuous indexing rotation to the blank, a pair of reciprocable tool slides, a clapper block movably mounted on each slide, a tool carried by each clapper block, means for reciprocating the tool slides, and means for moving the clapper blocks about axes extending substantially parallel to each slide, respectively, to move the tools to and from cutting position.

37. In a machine for producing gears, means for imparting a continuous rotary indexing motion to the blank, a pair of reciprocable tool slides, means for reciprocating the slides to move them alternately in opposite directions, a clapper block movably mounted on each slide, a tool carried by each clapper block and means for moving each clapper block about an axis extending substantially parallel to the direction of movement of its tool slide, said means being so arranged that the tools are in cutting position on the strokes of the slides in one direction and out of cutting position on the strokes of the slides in the opposite direction.

38. In a machine for producing gears, means for imparting a continuous indexing rotation to the blank, a pair of reciprocable tool slides, each of which is provided with arcuate guide ways curved about an axis substantially parallel to the direction of movement of said slide, a clapper block mounted on each slide, having curved ways movable in the guide ways of the corresponding tool slide, a tool secured on each clapper block, and means for moving the clapper block in the corresponding ways to move the tools alternately to and from cutting position.

39. In a machine for producing gears, a blank support, a tool support, a cradle upon which one of said supports is mounted, means for imparting a cutting movement to the tool, means for imparting a combined continuous indexing and generating rotation to the blank support, means for rotating the cradle on its axis in either direction at a relatively slow speed, means carried by the cradle for disengaging said drive when the cradle has reached a predetermined position, means for rotating the cradle on its axis in either direction at a relatively fast speed and means carried by the cradle for disengaging said last named drive when the cradle has reached a predetermined position.

40. In a machine for producing gears, a blank support, a tool support, a cradle upon which one of said supports is mounted, means for imparting a cutting movement to the tool, means for imparting to the blank a combined continuous indexing and generating rotation, means for rotating the cradle on its axis in either direction at a relatively slow speed, means for rotating the cradle on its axis in either direction at a relatively fast speed, means preventing engagement of one of said drives while the other is operatively connected to the cradle, means on the cradle adapted to disengage said slow speed drive when the cradle has reached a predetermined position in one direction of its movement to stop the cradle movement and means on the cradle adapted to disengage said fast speed drive when the cradle has returned to a predetermined starting position to stop the cradle in said position.

41. In a machine for producing gears, a blank support, a tool support, a cradle upon which one of said supports is mounted, means for imparting a cutting movement to the tool, means for imparting a combined continuous indexing and generating rotation to the blank support, means for driving the cradle in either direction, a shiftable clutch controlling the application of said drive, a movable member controlling said clutch, means for locking said member with the clutch engaged, means normally urging said member to disengage said clutch, and means carried by the cradle adapted to release said locking means when the cradle has reached a predetermined position.

42. In a machine for producing gears, a blank support, a tool support, a cradle on which one of said supports is mounted, a tool mounted on the tool support, means for imparting a cutting movement to the tool, means for imparting to the blank a combined indexing and generating rotation, drive means for rotating the cradle, a clutch for engaging said drive, means for holding the clutch in engaged position, and means on the cradle for disengaging said clutch when the cradle has rotated to a predetermined distance.

43. In a machine for producing gears, a blank support, a tool support, a cradle upon which one of said supports is mounted, a tool mounted on the tool support, means for imparting a cutting movement to the tool, means for imparting to the blank a combined indexing and generating rotation, drive means for rotating the cradle in one direction at one speed, drive means for rotating the cradle in the opposite direction at a different speed, a clutch for operatively engaging the first drive with the cradle, means for locking said clutch in engaged position, means adjustably secured to the cradle for disengaging said locking means when the cradle has rotated through a predetermined distance, means for moving said clutch to released position when said locking means is disengaged, a second clutch for operatively engaging the second drive with the cradle, means for holding the second clutch in engaged position and means adjustably secured to the cradle for disengaging the second clutch when the cradle has moved a predetermined distance in the opposite direction.

44. In a machine for producing gears, a blank support, a tool support, a cradle upon which one of said supports is mounted, a tool mounted on the tool support, means for imparting a cutting movement to the tool, means for imparting to the blank a combined indexing and generating rotation, drive means for rotating the cradle in one direction at one speed, drive means for rotating the cradle in the opposite direction at a different speed, a clutch for operatively engaging the first drive with the cradle, a clutch rod shiftable in one direction to engage said clutch, means locking said rod with said clutch in engaged position, means adjustably secured to the cradle for releasing said locking means when the cradle has moved a predetermined distance in one direction, means for shifting the rod in the opposite direction to disengage the clutch when said locking means is released, a clutch for operatively engaging the second drive with the cradle, and means adjustably secured to the cradle for shifting the clutch rod in the same direction as when engaging the first clutch to disengage the second clutch after a predetermined movement of the cradle in the opposite direction.

45. In a machine for producing gears, a blank support, a tool support, a cradle upon which one of said supports is mounted, a tool mounted on the tool support, means for imparting a cutting movement to the tool, means for imparting to the blank a combined continuous indexing and generating rotation, a slow speed drive for moving the cradle in one direction, a fast speed drive for moving the cradle in the opposite direction, separate clutch means for engaging either drive, a control device for said clutch means movable in one plane to engage one drive and in a plane at right angles thereto to engage the other drive, and means preventing movement of the control device in either plane until the clutch controlled by the movement of said device in the other plane has been moved to disengaged position.

46. In a machine for producing gears, a blank support, a tool support, a cradle upon which one of said supports is mounted, a tool mounted on the tool support, means for imparting a cutting movement to the tool, means for imparting a combined continuous indexing and generating rotation to the blank, a slow speed drive for moving the cradle in one direction, a fast speed drive for moving the cradle in the opposite direction, separate clutch means for engaging either drive, a control device for the clutches comprising a handle movable about an axis lying in one plane to engage and disengage one clutch and movable about an axis at right angles to the first axis to engage the other clutch, and a forked member so arranged that before the handle can be swung about its axis in one plane it must be centered relative to the forked member in the other plane thereby to disengage the clutch operated by its movement in the last named plane.

47. In a machine for producing gears, a blank support, a tool support, a cradle upon which one of said supports is mounted, means for imparting a cutting movement to the tool, means for imparting to the blank a combined continuous indexing and generating rotation, means for rotating the cradle on its axis in either direction at one speed, a shiftable clutch controlling the application of said drive, a movable member controlling said clutch, means for locking said member with the clutch engaged, resilient means acting to shift said member and clutch to neutral position when the locking means is released, means carried by the cradle for releasing said locking means when the cradle reaches a predetermined position on its movement in one direction, means for driving the cradle in either direction at a different speed from the first driving means, a shiftable clutch controlling the application of the second driving means, means preventing engagement of one of said clutches while the other is engaged, means connected to said movable member adapted on movement thereof against the action of said resilient means to shift the second clutch to neutral position and means carried by the cradle adapted to move said movable member against the action of said resilient means when the cradle has reached a predetermined position in its movement in a direction opposite to the first referred to movement.

48. In a machine for producing gears, a blank support, a tool support, means for imparting a cutting movement to the tool, means for imparting a continuous indexing rotation to the blank, means for producing a step by step depthwise feed movement between tool and blank and means operated by the feed mechanism to disengage said mechanism when a predetermined feed movement has been secured.

49. In a machine for producing gears, a blank support, a tool support, means for imparting a cutting movement to the tool, means for imparting a continuous indexing rotation to the blank, a slide upon which one of said supports is mounted, a screw for moving said slide, means for giving the screw a step by step rotation, a member adjustable to govern the amount of intermittent movement of the screw, and provided with means for locking it in any desired position, said screw being arranged to disengage said locking means when a predetermined feed has been attained, means for returning said adjustable member to zero position when released and means carried by said member operative when in zero position to prevent further movement of said screw and thereby prevent further feed.

50. In a machine for producing gears, a blank support, a tool support, means for imparting a cutting movement to the tool, means for imparting a continuous indexing rotation to the blank, a slide on which one of said supports is mounted, a screw and nut for moving said slide, means for giving one of said members a step by step rotation including a ratchet wheel and pawl, a rotatable control member mounted coaxially with said ratchet wheel and adjustable to govern the amount of intermittent feed, means for locking said control member in any adjusted position, means normally urging said member to return to zero position, said movable member being arranged to disengage said locking means when the predetermined feed has been attained and a guard carried by said member adapted in zero position of said member to deflect said pawl and prevent further feed movement.

51. In a machine for producing gears, means for imparting to the blank a continuous indexing rotation, means for moving the tool at a uniform velocity across the face of the blank and means for producing an added relative movement between tool and blank at a variable velocity.

52. In a machine for producing gears, means for moving the tool at a uniform velocity across the face of the blank, a differential in the blank drive train, means for actuating one element of said differential at a uniform velocity to impart to the blank a continuous indexing rotation and means for imparting a movement at a variable velocity to another element of said differential which combines with the uniform rotational movement of the blank and the uniform movement of the tool to control the form of longitudinal tooth curve produced on the blank.

53. In a machine for producing gears, a blank support, a tool support, a slide on which one of said supports is mounted, a screw for moving said slide to feed the support carried thereby relative to the other support, means for rotating the screw, a member adjustable to govern the amount of feed movement desired, means for locking said member in any adjusted position, said screw being arranged to disengage said locking means when the predetermined desirable feed has been obtained, means for returning said adjustable member to zero position when released, and means carried by said member operative when in zero position to prevent further movement of said screw and thereby prevent feed.

54. In a machine for producing gears, a blank support, a tool support, a slide on which one of said supports is mounted, a screw for moving said slide to feed the support carried thereby relative to the other support, means for rotating the screw, a member adjustable to govern the amount of feed movement desired, means for locking said member in any adjusted position, said screw being arranged to disengage said locking means when the predetermined desired feed has been obtained, and means actuated into position on disengagement of said locking means to prevent further feed.

55. In a machine for producing gears, means for imparting a continuous indexing rotation to the blank, a pair of tools adapted, respectively, to cut opposite side tooth surfaces of the blank reciprocable across the toothed portion of the blank, and means operative to bring said tools alternately into cutting position to cut first one and then an opposite side tooth face of a blank.

56. In a machine for producing gears, a pair of tools adapted to cut, respectively, opposite side tooth surfaces of a gear blank reciprocable across the toothed portion of the blank, means operative to bring said tools alternately into cutting position, and means operative to impart an indexing movement to the blank between operations of the two tools.

57. In a machine for producing tapered gears, a cradle, a pair of arms adjustable angularly on the cradle about a common axis offset from the axis of the cradle, a tool slide reciprocable on each arm, and means for reciprocating said tool slides simultaneously in opposite directions.

58. In a machine for producing tapered gears, means for imparting a continuous indexing rotation to the blank, a cradle, a pair of arms adjustable angularly on the cradle about a common axis offset from the axis of the cradle, a tool slide reciprocable on each arm, and means for reciprocating said tool slides simultaneously in opposite directions.

59. In a machine for producing tapered gears, means for imparting a continuous indexing rotation to the blank, a cradle, a pair of arms adjustable angularly on the cradle about a common axis offset from the axis of the cradle, a tool slide reciprocable on each arm, means for reciprocating said tool slides simultaneously in opposite directions, a tool mounted on each slide, said tools being adapted, respectively, to cut opposite side tooth surfaces of a gear blank, and means for clapping the tools to and from operative position, said last named means being operative to move the tools alternately to and from cutting position whereby the tools cut alternately on movement of the slides in opposite directions.

MAXWELL H. HILL.